United States Patent
Griffin et al.

(10) Patent No.: US 10,277,400 B1
(45) Date of Patent: Apr. 30, 2019

(54) BIOMETRIC ELECTRONIC SIGNATURE TOKENS

(71) Applicant: Wells Fargo Bank, N.A., San Francisco, CA (US)

(72) Inventors: Phillip H. Griffin, Raleigh, NC (US); Jeff J. Stapleton, Arlington, TX (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 191 days.

(21) Appl. No.: 15/299,308

(22) Filed: Oct. 20, 2016

(51) Int. Cl.
*H04L 9/32* (2006.01)
*H04L 9/14* (2006.01)
*H04L 9/30* (2006.01)

(52) U.S. Cl.
CPC ............. *H04L 9/3231* (2013.01); *H04L 9/14* (2013.01); *H04L 9/30* (2013.01); *H04L 9/3247* (2013.01); *H04L 9/3263* (2013.01)

(58) Field of Classification Search
CPC . H04L 9/3231; H04L 9/14; H04L 9/30; H04L 9/3247; H04L 9/3263; H04L 9/3242; H04L 9/08; G06F 21/32
USPC ..... 713/156, 178, 186; 380/277, 278; 726/9, 726/20
See application file for complete search history.

(56) References Cited

U.S. PATENT DOCUMENTS

| | | | |
|---|---|---|---|
| 6,553,494 B1 | 4/2003 | Glass | |
| 6,745,327 B1 | 6/2004 | Messing | |
| 6,819,219 B1 * | 11/2004 | Bolle | G06F 21/32 340/5.52 |
| 7,024,562 B1 * | 4/2006 | Flink | H04L 9/3231 713/176 |
| 7,162,635 B2 | 1/2007 | Bisbee et al. | |
| 8,838,990 B2 * | 9/2014 | Boult | G06F 21/32 713/186 |
| 2004/0054913 A1 * | 3/2004 | West | G06F 21/64 713/186 |

(Continued)

OTHER PUBLICATIONS

American National Standard For Financial Services, Cryptographic Message Syntax—ASN.1 and XML, ANSI X9.73-2010, Apr. 15, 2010. 89 pages.

(Continued)

*Primary Examiner* — Saleh Najjar
*Assistant Examiner* — Khalid M Almaghayreh
(74) *Attorney, Agent, or Firm* — Foley & Lardner LLP

(57) ABSTRACT

The methods and system allow for the generation of a biometric electronic signature token using a subsequent biometric sample after an enrollment of a biometric reference value in a biometric system. The biometric electronic signature token is such that the data would be signed data, cryptographic message type, to package this signature, providing two authentication factors: the possession of the private key associated with the public/private key pair used to sign the signed data and the biometric sample of the user that could be matched against the template. The process allows a signing party to enroll in a biometric service, sign a piece of data or content using a public key, that may be tied to a trusted anchor certificate authority, and submit a biometric sample. Subsequently, the relying party may validate the information on that piece of data or content to confirm the identity of the signing party.

21 Claims, 6 Drawing Sheets

(56) References Cited

U.S. PATENT DOCUMENTS

| | | | |
|---|---|---|---|
| 2004/0059924 A1* | 3/2004 | Soto | G06F 21/32 |
| | | | 713/186 |
| 2007/0088950 A1* | 4/2007 | Wheeler | G06Q 20/00 |
| | | | 713/170 |
| 2009/0070266 A1 | 3/2009 | Shah et al. | |
| 2009/0164796 A1* | 6/2009 | Peirce | G06F 21/32 |
| | | | 713/186 |
| 2010/0002485 A1 | 1/2010 | Janzen | |
| 2010/0169651 A1* | 7/2010 | Scheidt | H04L 9/3231 |
| | | | 713/176 |
| 2010/0205431 A1* | 8/2010 | Griffin | G06F 21/32 |
| | | | 713/158 |
| 2010/0242102 A1* | 9/2010 | Cross | G06F 21/32 |
| | | | 726/7 |
| 2013/0212397 A1 | 8/2013 | Lehwany | |
| 2016/0269178 A1* | 9/2016 | Yang | H04L 63/0861 |
| 2016/0269402 A1* | 9/2016 | Carter | H04L 9/0816 |
| 2016/0323273 A1* | 11/2016 | Aufderheide, Jr. | |
| | | | H04L 63/0861 |
| 2016/0330027 A1 | 11/2016 | Ebrahimi | |

OTHER PUBLICATIONS

American National Standard for Financial Services, Trusted Time Stamp Management and Security, ANSI X9.95-2011. 150 pages.
International Telecommunication Union, Series X: Data Networks, Open System Communications and Security Directory, ITU-T, X.509, Oct. 2012. 208 pages.

* cited by examiner

BIOMETRIC ELECTRONIC SIGNATURE TOKENS

BACKGROUND

As computer-based technologies have evolved, conventional in-person and paper-based transactions and communications are increasingly performed electronically over networks (e.g., the internet). Although electronic communications have significantly reduced costs and improved efficiencies, they pose significant risks regarding identification and authentication of users, and integrity of data.

An electronic signature ("e-signature") refers to data in electronic form that is associated with a record and that is used by a signatory or signing party to sign the record. An e-signature is intended to provide a secure and accurate identification method for the signatory to provide a seamless transaction to a relying party. Definitions of e-signatures vary depending on the applicable jurisdiction. For example, the United States is governed under the Electronic Signatures in Global and National Commerce Act ("ESIGN") and the Government Paperwork Elimination Act ("GPEA"). Under the ESIGN an e-signature is defined as an electronic sound, symbol, or process, attached to or logically associated with a contract or other record and executed or adopted by a person with the intent to sign the record. Additionally under United States federal law, the GPEA further defines the term "electronic signature" means a method of signing an electronic message that: (A) identifies and authenticates a particular person as the source of the electronic message; and (B) indicates such person's approval of the information contained in the electronic message. Increasingly, digital signatures are used in e-commerce and in regulatory filings to implement electronic signature in a cryptographically protected way.

Digital signatures are mathematical schemes for demonstrating the authenticity of digital messages or electronic documents. A variety of cryptographic techniques are used to encrypt data and to create digital signatures. With symmetric key cryptographic systems, a pair of users who desire to exchange data securely use a shared "symmetric" key. With this type of approach, a sender of a message uses the same key to encrypt the message that a recipient of the message uses to decrypt the message. Symmetric key systems require that each sender and recipient establish the shared key in a secure manner. Public key systems may also be used to exchange messages securely. With public-key cryptographic systems, two types of keys are used—public keys and private keys. A sender of a message may encrypt the message using the public key of a recipient. The recipient may use a corresponding private key to decrypt the message.

Additionally, public key cryptographic systems (e.g., asymmetric key cryptographic systems) may be used to produce digital signatures. A recipient of a message that has been digitally signed can use the digital signature to verify the identity of the message's sender and to confirm that the message has not been altered during transit. In a typical digital signature arrangement, a sender uses a cryptographic hash function to produce a message digest. The message digest is much smaller than the original message, but is still unique to the message for practical purposes. The sender then uses the sender's private key to sign the message digest. The process of signing the message digest uses a mathematical operation that can only be performed by the sender who possesses the private key. The message and signed message digest (the "digital signature") may then be sent to a recipient. As will be appreciated, the recipient is an entity that can use the digital signature and the message sender's public key to determine that the sender is the message signer and that the integrity of the message has not been compromised.

Biometrics can be used for human identification and authentication for physical and logical access. Logical access can include access to applications, services, or entitlements. Authentication systems require that the party that wishes to be authenticated has enrolled a biometric reference template at a biometric service provider ("BSP") or similar entity. A biometric reference template is a digital reference of an individual's distinct characteristics obtained by processing one or more biometric samples from the individual. Biometric traits may include, for example, biological (e.g., fingerprint, iris, hand geometry, etc.) and behavioral (e.g., gait, gesture, keystroke dynamics, etc.) characteristics that reliably distinguish one person from another. Digital representations of these characteristics are stored in an electronic medium, and later used to authenticate the identity of an individual.

SUMMARY

Various embodiments relate to a method performed by a processor of an authentication computing system. An example method includes tokenizing a biometric sample captured from a user to generate a tokenized biometric sample. A record and the tokenized sample are digitally signed with a private key associated with the user, wherein authenticity and data integrity of the record can be determined based on each of the digitally signed record, the tokenized biometric sample, and a public key of a public/private key pair including the private key.

Various embodiments relate to a method performed by a processor of an authentication computing system. An example method includes enrolling a biometric template with a biometric service provider computing system. Enrolling comprises receiving a biometric reference sample from the user and generating a biometric reference template based on biometric characteristics extracted from the biometric reference sample. The biometric reference template is associated with the user identifier and stored. An electronic signature is generated including tokenizing a biometric sample captured from a user to generate a tokenized biometric sample. A record and the tokenized sample are digitally signed with a private key associated with the user, wherein authenticity and data integrity of the record can be determined based on each of the digitally signed record, the tokenized biometric sample, and a public key of a public/private key pair including the private key.

Various other embodiments relate to an authentication computing system. The computing system includes a storage location comprising a plurality of biometric reference templates. The server system includes a processor and instructions stored in non-transitory machine-readable media. The instructions are configured to cause the server system to enroll a biometric reference template for a signer. An electronic signature is generated, such that the generation of the electronic signature comprises associating a record to the electronic signature. The electronic signature further comprises establishing an asymmetric key pair including a public and private key pair. A biometric sample is extracted from the signer. The extracted biometric sample is tokenized, resulting in a tokenized biometric sample. The message is digitally signed with the private key, the message including the tokenized biometric sample and the record.

Various other embodiments relate to a method performed by a processor of a computing system. The method includes receiving an electronic signature. The electronic signature includes a message including a first tokenized biometric sample captured from a user and a record, the message having been digitally signed with a private key. The electronic signature is verified. The verification includes receiving a second biometric sample captured from the user. A biometric reference template is generated based on biometric characteristics extracted from the second biometric sample, such that an identity of the user may be validated by detokenizing the first tokenized biometric sample and matching the detokenized first tokenized biometric sample with the biometric reference template.

These and other features, together with the organization and manner of operation thereof, will become apparent from the following detailed description when taken in conjunction with the accompanying drawings, wherein like elements have like numerals throughout the several drawings described below.

Figure 1:
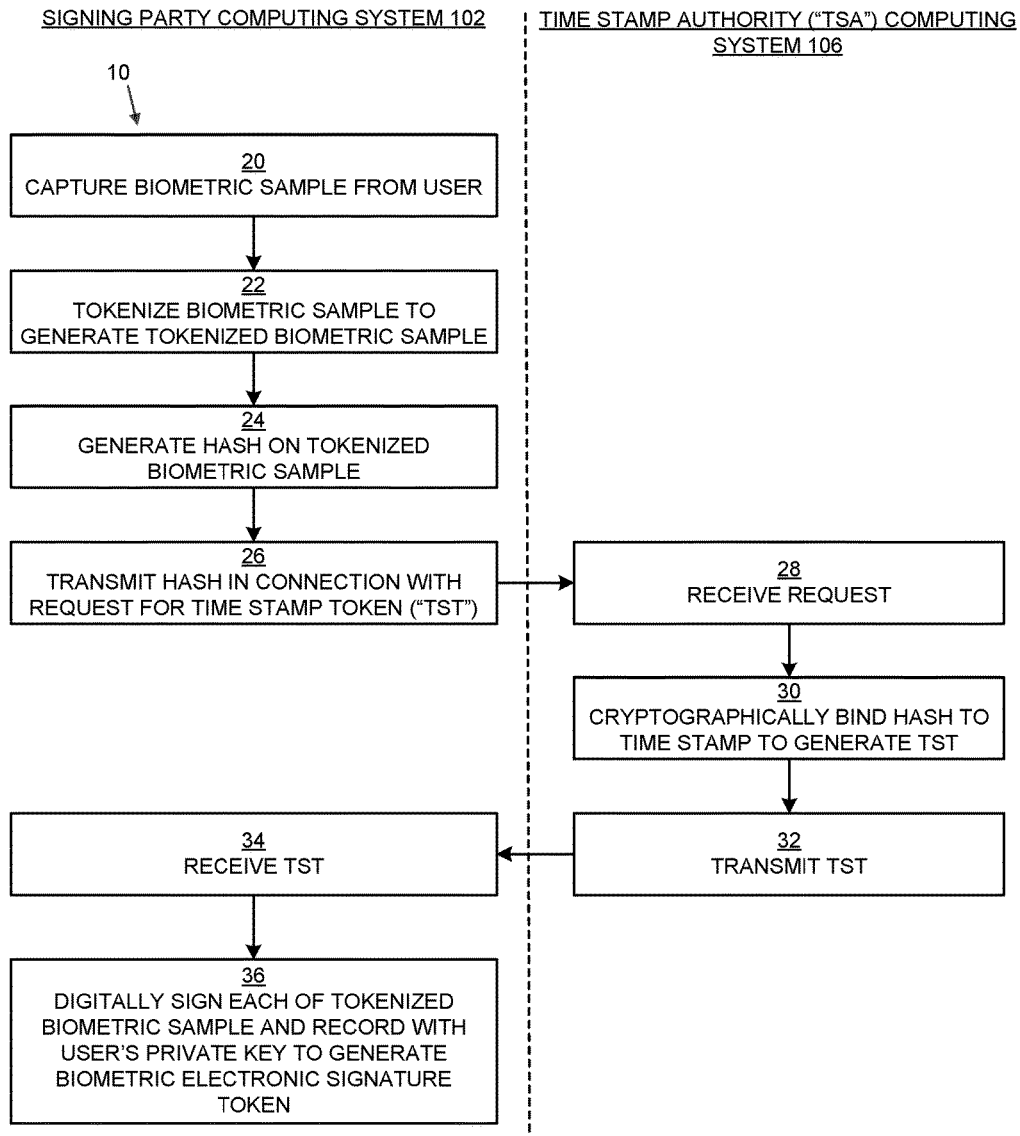
FIG. 1 is a flow diagram illustrating a method of generating a biometric electronic signature token, according to an example embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Various embodiments described herein relate to systems and methods for a biometric electronic signature token ("BEST") processing system for creating and verifying a BEST, which is a biometrics-based electronic signature on a record. As will be appreciated, the BEST processing system may be used to create and verify BESTs in connection with ecommerce transactions or other types of signing events, such as those involving cloud-based and blockchain-based systems, for example. A BEST provides a signing party with the ability to provide a biometric sample from the signing party and a record, both protected under a digital signature, thereby providing assurance of the identity of the message (e.g., record) signer to a relying party. For example, the message signer could provide a BEST containing a loan agreement and the signer's fingerprint (tokenizing the fingerprint biometric data for further security), providing greater assurance to a relying party on the identity of the message signer than traditional digital signature methods alone. Accordingly, a BEST provides the relying party with all information needed to verify the digital signature and tokenized biometric information of a signing party included in the BEST.

In one embodiment, a BEST is generated by cryptographically binding a tokenized biometric sample of a user (e.g., message signer) to a record, allowing the user (signing party) to associate his/her biometric information with the record. The cryptographic binding is performed via a digital signature associated with a public key certificate of the user. The BEST is a digitally signed record or signed hash of the record and the signing party's tokenized biometric sample that is protected under a digital signature and tied to an identity certificate. The BEST can subsequently be used to provide two-factor authentication via a "something-you-have" factor in the form of the user's private key, and a "something-you-are" factor in the form of the user's biometric sample. The BEST processing system allows a relying party to validate the information and authenticate the identity of the signing party at a later time, either through verification of a known identity or identification of a matching reference template and user identity. Through the signer certificate, extensions, and information contained in the BEST, a relying party may have all information needed to verify the digital signature and tokenized biometric information of the signing party.

In some embodiments, the BEST processing system requires that a user (e.g., signing party) first enroll in a biometric system to generate a biometric reference template that can be used for subsequent biometric matching to verify the user's identity via a biometric sample acquired from the user. However, in other embodiments, the BEST processing system verifies the identity of a user in connection with a biometrically-signed message without the user first enrolling in a biometric system. In one embodiment, a user first captures a biometric sample (e.g., fingerprint, retina scan, voice sample, etc.) from himself or herself. The biometric sample is then tokenized using a tokenization service provider ("TSP") in order to protect the confidentiality of the user's personally identifiable information ("PII"). The user digitally signs each of the tokenized biometric sample and a record with a private key associated with the user. This process is also referred to signing the record, or the message digest of the record. As described herein, the process of signing the hash of the record or message digest includes the process of signing the record directly (e.g., not computing a hash). Generally, the message digest is hash numbers (e.g., algorithmic numbers) that represent the specific files (e.g., protected works) in a BEST that are digitally signed. One message digest is assigned to particular data content such that a change to any of the specific files will be reflected in the message digest. In some arrangements, the message digest includes a direct signature that does not first hash the information to be protected before signing the content. Some embodiments of the digital signature process further include computing a hash on the tokenized biometric sample, and using the hash as an input to a trusted time stamp process. For example, in one embodiment, the user transmits the hash to a time stamp authority ("TSA"), which cryptographically binds the hash to a time stamp to generate a time stamp token ("TST"). The signing party sends the BEST, for example, in the form of a message, to a relying party.

A BEST provides a relying party with all information needed to verify the digital signature and tokenized biometric information of a signing party included in the BEST. A relying party can verify the signature to provide the "something-you-have" authentication factor. In one embodiment, path validation is performed on the signer certificate chain back to a trust anchor. relying party determines whether a received BEST and signed message digest (the "digital signature") that was sent to the relying party is valid and trusted (e.g., that the signature itself is valid and that the certificates in the path are not on a revocation list). The recipient can apply the same hash function to the received message to produce the message digest. Using the public key of the sender, the recipient can attempt to verify the signed version of the message digest that the recipient has received from the sender. The verification procedure uses the sender's public key in a mathematical operation to determine whether the signature was indeed created from the same message digest using the correct private key. If the verification function is successful, the signed version of the message digest will be proven to originate from the message digest that the recipient has produced by applying the hash function directly to the message. A successful verification operation therefore allows the recipient to confirm the true authorship of the message and to confirm that the message has not been altered. By using both public key signatures and public key encryption, messages can be sent securely and authorship and message authenticity can be verified. In some embodiments, signcryption is utilized for digitally signing and encrypting messages.

A BEST provides a relying party with an identification authentication factor. The relying party can authenticate the identity of the user via the tokenized biometric sample to provide the "something-you-are" identification factor. The relying party can request for the tokenized biometric sample to be detokenized by the TSP. After providing the proper credentials and receiving the detokenized biometric sample, the relying party can request a BSP to authenticate the detokenized biometric sample. Biometric authentication processes include verification and/or identification. Verification is the process of comparing a match template against a specific reference template based on a claimed identity (e.g., user ID, account number, etc.). Verification is a "one-to-one" comparison that entails comparing a match template generated from a newly captured sample with a previously generated reference template stored in a database or on an ID card. Identification is the process of comparing a submitted biometric sample against some or all enrolled reference templates to determine an individual's identity. Identification is a "one-to-many" comparison that entails the comparison of a match template generated from a newly captured sample with all of the templates in the database. It is most often used to determine whether or not a person has previously enrolled in the system.

In some arrangements, a BEST provides the relying party with a time identification factor. The relying party can also verify a TST associated with the BEST by completing a "hash check" with the information. This process includes generating a hash of the original data, appending the timestamp given by the TSA, and calculating the hash of the result (the hash of the original data with the appended time stamp).

The BEST processing system provides technical solutions to computer-centric and internet-centric problems associated with conventional authentication systems. For example, the BEST processing system, according to various arrangements, provides a more efficient and effective mechanism to the industry by providing a biometrics-based digital signature message system for communicating parties. This biometric-based digital signature message system is in accordance with industry standards and allows the signing party to provide assurance of the identity of the message (e.g., record) sender and signer. This provides greater assurance to the relying party than a typical digital signature process, as a BEST contains the biometric information for the signing party. The BEST processing system includes the use of a private/public key pair and a biometric sample that makes the unauthorized replay (e.g., impersonation) of a user's biometric sample not feasible, as an attacker would need both a biometric sample and the user's private key. Additionally, the use of a TST from a TSA provides greater assurance against unauthorized replay as the TST assurance proof that the provided biometric sample is "fresh" (e.g., that the sample is not from an unauthorized party re-using a biometric sample). Consequently, the BEST processing system provides greater security to the signing party and, in turn, the relying party by providing a more effective and reliable medium for providing the identity of the signing party.

Further, the methods and systems described herein alleviate the strain on processing power and memory components currently required to manage, store, and authenticate the biometric sample of a signing party. Additionally, the arrangements herein utilize a less strenuous key management and negotiation method, along with cryptographic message data techniques that provide real-time tokenization, time-stamping, and digital signing of the content. For example, in some arrangements, the user provides a biometric sample on a mobile computing system, the sample is tokenized using a TSP, time stamped by a TSA, and digitally signed. The BEST processing system utilizes a signed attributes feature to provide for an easy and lightweight mechanism to bind additional information to biometric sample and content. Additionally, the BEST processing system reduces the amount of time required to securely share additional authentication factors (e.g., a video chat identification session, transport layer security sessions, traveling to the location to provide identification credentials, etc.) by making use of extensions and/or detached signature messages. The BEST processing system's use of additional attributes avoids complicating certificate issuance and management of processes by allowing the user to add this information regarding certificate extension payload as a signed attribute.

These problems arise out of the use of computers and the Internet, because the online communications, transactions, and payment services cannot exist without the use of computers and the Internet. Accordingly, problems relating to authenticating content providers and signing party arise out of the use of computers and the Internet. In addition, the inability to properly authenticate a user in an online communication, cannot exist outside of computers and the Internet.

Referring to FIG. 1, a flow diagram of a method 10 of generating a BEST is shown, according to an example embodiment. Generally, the method 10 is used to produce a cryptographic hash of a record and tokenized biometric sample of the signing party that is subsequently signed by the signing party's private key of a public/private key pair. The generated BEST cryptographically binds the record and the biometric information of the signing party, along with any additional information that the signing party wants to provide, either under the digital signature or in an extension or similar feature.

The method 10 is described in connection with a signing party and a TSA. The signing party is an entity that manages the signing party computing system 102 of FIG. 2 and the TSA manages the TSA computing system 106 of FIG. 2. However, the method 10 may be similarly performed by other systems and devices. The method 10 is performed on the back-end: the signing party provides a record and a biometric sample and the BEST processing system generates the digitally signed BEST. While the method 10 includes the use of a TST to time stamp the tokenized biometric reference template and/or the record, in some arrangements, the BEST may be transmitted to a relying party without the generation or association of a TST. In some arrangements, the TST is a X9.95 Trusted Time Stamp Token.

The method 10 begins with the signing party wanting to "sign" a record (e.g., a contract, document, communication, etc.) by binding the record with his or her biometric identifier under a digital signature. At 20, the signing party computing system 102 extracts a biometric sample from the signing party (e.g., user). The sample could be extracted using a biometric sensor or similar device (e.g., using a finger print scanner on a mobile computing device). In some arrangements, the extracted biometric sample is first transmitted to a BSP to be processed into biometric data.

At 22, the signing computing system 102 tokenizes the biometric sample to generate a tokenized biometric sample. Tokenization is the process of mapping a plaintext value (e.g., the biometric sample) to an existing or newly-generated surrogate value (e.g., a token). The token is a surrogate value used in place of the original value. The token may share a common value (e.g., the length, character set, etc.) with the original underlying biometric data it is replacing. However, this mapping of the biometric data to tokens does not have to be one-to-one. For example, different tokens could replace the same biometric sample in two separate data repositories. This action may not be efficient, but it may be necessary in certain situations (e.g., where a TSP supports multiple merchants as customers). In some arrangements, the signing party computing system transmits the biometric sample to a TSP that provides a tokenization service. The TSP may be an entity that builds a collection of software and hardware components (e.g., servers, applications, software) capable of providing tokenization and detokenization services, as well as managing the secure exchange of tokens.

At 26, the signing party computing system 102 transmits a hash of the tokenized biometric sample to a TSA computing system 106 with a request to time stamp the hash of the tokenized biometric sample. A hash algorithm is a function that maps a bit string of arbitrary length to a fixed-length bit string called a hash. A hash function is such that it is computationally infeasible to find any input that maps to any pre-specified output and it is computationally infeasible to find any two distinct inputs that map to the same output. The use of a TST from a TSA provides assurance that the biometric sample is "fresh" (e.g., that the sample is not from an unauthorized party re-using a biometric sample). In some arrangements, the signing party computing system 102 may transmit a hash of the record along with the hash of the tokenized biometric sample. In other arrangements, a hash with the input of both the record and the tokenized biometric sample (e.g., as one appended to the other) is generated. In other arrangements, a hash of the digital signature is transmitted.

At 28, the TSA computing system 106 receives the hash of the information and the request from the signing party computing system 102 to generate a TST. The TST is a data object that binds a representation of data to a time stamp (e.g., a particular time variant parameter which denotes a point in time with respect to a common time reference), thus establishing evidence that the information (e.g., record, tokenized biometric sample, etc.) existed at that point in time.

At 30, the TSA computing system 106 cryptographically binds the hash of the information to the time stamp. The TST contains a hash value (e.g., the hash of the information), the time stamp (e.g., time of generation) and a cryptographic binding (e.g. cryptography). In arrangements where a TST is generated for signed digital data, the TST contains the digital signature, the time stamp, and a cryptographic binding. In this arrangement, the TST provides evidence to a verifier and a public key infrastructure ("PKI") relying party that the digital signature existed when the TST was generated. At 32, the TSA computing system 106 returns a response containing the TST to the signing party computing system 102.

At 36, the signing party computing system 102 digitally signs each of the tokenized biometric sample and record with the signing party's private key to generate the BEST. Generally, the digital signature process includes generating a hash of the content-to-be-signed (e.g., record, tokenized biometric sample, or other content to be protected under the digital signature) using a hash algorithm. The signing party may identify other attributes or parameters to include in the resulting token and then the hash of the content-to-be-signed is signed with the signing party's private key of a public/private key pair. The resulting BEST cryptographically binds the content-to-be-signed, thus providing the signing party with a signer identity authentication parameter (e.g., the biometric sample) and a certificate identity parameter (e.g., the public/private key pair) bound to the record.

In some arrangements, attributes that are protected under the signature on the content-to-be-signed may be included in a component of the digital signature. These signed attributes can serve the same function in an identity management context as "signed claims" or "signed assertions" provided using X.509 Attribute Certificates or XML SAML assertions. The attributes can be used, for example, to identify a particular transaction type, such as an airline ticket purchase as opposed to a patient's medical contents release. In other arrangements, the attributes are accomplished by using a unique information object identifier ("OM") associated with a particular instance of a BEST signature type and is used to indicate the attributes that are expected to be present in the content.

In some arrangements, information related to a BEST, the signing party, the record, etc. can be "detached" from the BEST. Detached refers to information that can be transferred out-of-band, stored separately, and provided at a later time, when needed for signature verification. This feature of the method 10 enables a pseudo-anonymous digital signature whose validity is determined at the time the detached message components were provided by the relying party. For example, a BEST is initially provided to bid for an item and, after winning the bid, the detached message components are provided to give information to verify (e.g., detokenize and compare to a biometric reference value of a BSP, receive a public key, etc.) the identity of the signing party.

In other arrangements, the digital signature of a BEST is in the form used to sign an X.509 certificate. In those arrangement's, the certificate is a "sequence" type containing a component that is the content-to-be-signed, the digital signature on the content-to-be-signed component, and information indicating the signing party's public key, the digital signature algorithm used, and additional parameters used to form the BEST.

In some arrangements, the digital signature of a BEST is completed using the Abstract Syntax Notation One ("ASN.1") type "SignedData." In those arrangements, a cryptographic hash is used to create the BEST on the content-to-be-signed and any associated attributes carried in type SignedData. The hash is calculated using the hash algorithm and parameters specified by the signer, the content-to-be-signed, and any attributes the signer wants to authenticate and cryptographically bind to the content. In some arrangements the TST is not part of the digital signature message. In other arrangements, the TST is included in "attributes" of the SignedData message. For example, both a Security Assertion Markup Language ("SAML") assertion and the TST could be included in the SignedData UnsignedAttributes field, as well as being cryptographically bound to the content. Additionally, any SignedData content-to-be-signed (e.g., tokenized biometric reference template, record, TST, etc.) can be "detached." The detached content is such that the signature in the SignedData message is performed over the content-to-be-signed, but that signed content is not included in the SignedData message, thereby being detached. However, the content-to-be-signed must be available when the SignedData signature is verified, since the signature verification process requires computing the hash over the content-to-be-signed. For example, when a biometric reference template is signed, applications can convey the template content separately from any signed attributes associated with the template. This allows an application process to operate on the biometric template (e.g., during the matching process) while ignoring associated information security management attributes, and to rely on another application process (e.g., a Web service to perform signature verification). In some arrangements utilizing the SignedData message, the BEST processing system can generate an information object of class "attribute" to provide additional information in the SignedData message, for example, a customer number, financial institution, account, request information for a BSP or TSP, and other information the signing party would like to include with the record in the BEST.

Additionally, certificates to support the key management techniques can be included in a BEST using the typed SignedData. The certificates component of type SignedData is a value of type "Certificates," which may contain a collection of one or more certificates. The certificates used in X9.73 are signed binary objects, whose digital signatures have been calculated over values encoded using the Distinguished Encoding Rules ("DER") of ASN.1 using schema defined for these types in other standards. In order to verify the signatures on these objects, their original encodings must be maintained, but these values must also be represented in XML markup in a useful textual format. Consequently, the values in the certificates component of type Certificates have been Base64-armored to minimize their size when represented using XML markup while preserving their original encodings. The input to the Base64 processing is defined in this Standard as a Basic Encoding Rules ("BER") encoded value of type SET OF CertificateChoices. Any combination of certificates, including X.509 certificates, attribute certificates and certificates supporting XML Advanced Electronic Signatures ("XAdES") may be included in the Certificates type, and they may appear in any order.

Figure 2:
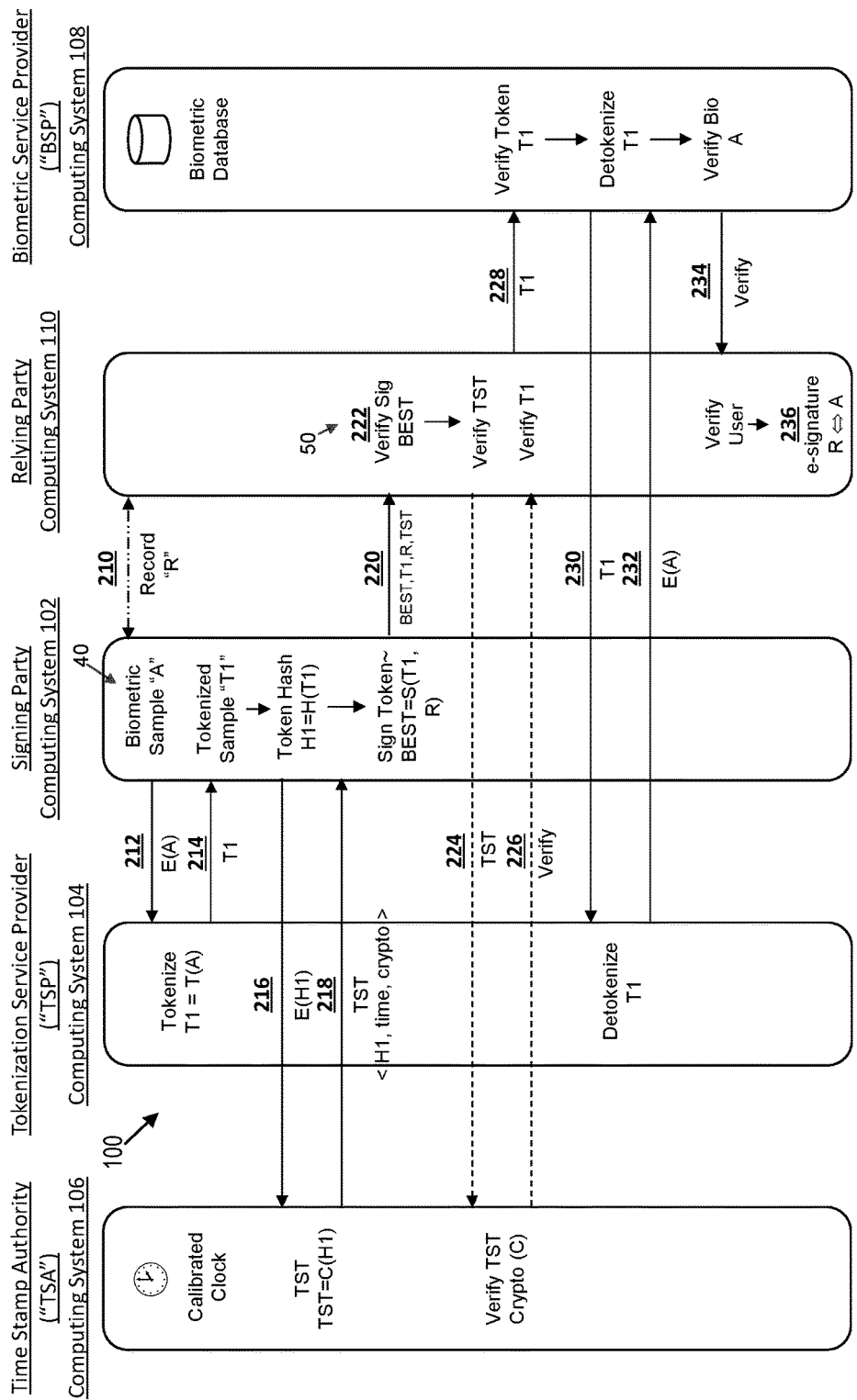
FIG. 2 is a flow diagram of a biometric electronic signature token processing system, according to an example embodiment.

Referring to FIG. 2, a flow diagram of the BEST processing system 100 that includes the method 40 of generating a BEST and a method 50 of verifying the BEST is illustrated, according to an example embodiment. Generally, the method 40 is used to produce a cryptographic hash of a record and tokenized biometric sample of the signing party which is subsequently signed by the signing party's private key of a public/private key pair. The generated BEST cryptographically binds the record and the biometric information of the signing party, along with any additional information that the signing party wants to provide, either under the digital signature or in an extension or similar feature. Generally, the method 50 is used to verify a BEST. To verify the signature, the relying party uses the signing party's public key from a valid certificate, computes a hash of the content (e.g., the tokenized biometric sample and record), and signs the message digest with the signing party's public key. A BEST signature algorithm is such that if the signature is valid, the result should be the same as the value of the signature component. The BEST processing system 100 includes a signing party computing system 102, a TSP computing system 104, a TSA computing system 106, a BSP computing system 108, and a relying party computing system 110.

The BEST processing system 100 enables biometric authentication and provides assurance, via a biometric comparison of a sample to a reference value, that the signer of the content is the intended signer. A biometric enrollment process ensures that the identity matches and provides assurance of identity, as enrollment involves vetting and due diligence of the enrolling party. The BEST processing system 100 provides a two-factor authentication system: (1) the public/private key pair used to sign the content and (2) the biometric sample of the signing party for matching against their biometric reference value. The BEST processing system 100 protects against future instances of the cryptography on the key pair factor failing by providing a biometric matching mechanism. For example, if key pairs are not long enough or were compromised by a protocol vulnerability, the biometric sample would still provide a strong authentication factor for the content. Additionally, a TST from a TSA bound to the hash of the biometric sample provides assurance to the relying party that the biometric sample is not from an unauthorized party (e.g., attacker, man-in-the-middle, etc.) replaying or reusing a biometric sample.

The method 40 is similar to the method 10 of FIG. 1, however in method 40 the tokenization of the biometric sample is done by a TSP rather than within the signing party computing system 102. The method 40 is performed on the back-end: the signing party provides a record and a biometric sample and the BEST processing system generates the digitally signed BEST. The method 40 assumes that the signing party has a biometric reference template stored on the BSP computing system 108. The method 40 begins with the signing party wanting to "sign" a record (e.g., a contract, document, communication, etc.) by binding the record with his or her biometric identifier under a digital signature at 210.

At 212, the signing party computing system 102 extracts a biometric sample from the signing party and transmits the biometric sample to the TSP computing system 104. The TSP computing system 104 receives the biometric sample and tokenizes it, resulting in a tokenized biometric sample which is transmitted back to the signing party computing system 102 at 214.

The signing party computing system 102 transmits a hash of the tokenized biometric sample to a TSA computing system 106 with a request to time stamp the hash of the tokenized biometric sample at 216. Beneficially, the use of a TST from a TSA provides assurance that the biometric sample is "fresh" (e.g., that the sample is not from an unauthorized party re-using a biometric sample). In some arrangements, the signing party computing system 102 may transmit a hash of the record along with the hash of the tokenized biometric sample. In other arrangements, a hash with the input of both the record and the tokenized biometric sample (e.g., as one appended to the other) is generated. In other arrangements, a hash of the digital signature is transmitted.

At 218, the TSA computing system 106 receives the hash of the information and the request from the signing party computing system 102 to generate a TST and generates and transmits the TST to the signing party computing system 102. The TST that contains a hash value (e.g., the hash of the information), the time stamp (e.g., time of generation), and a cryptographic binding (e.g. cryptography).

At 220, the signing party computing system 102 digitally signs each of the tokenized biometric sample and record with the signing party's private key to generate a BEST. Generally, the digital signature process includes generating a hash of the content-to-be-signed (e.g., record, tokenized biometric sample, other content to be protected under the digital signature) using a hash algorithm. The signing party computing system 102 transmits the BEST, tokenized biometric sample, record, and TST to the relying party computing system 110 to conclude step 220.

The method 50 is for the verification of the BEST by the relying party. The method 50 is performed on the back-end: the relying party provides the BEST and a tokenized biometric sample, and the BEST processing system verifies the information. The method 50 assumes that the signing party has a biometric reference template stored on the BSP computing system 108. The method 50 begins with the relying party computing system verifying the digital signature of the BEST at 222. To verify, the relying party computing system 110 generates a cryptographic hash is of the content (e.g., record, tokenized biometric sample, etc.) identified in the BEST and this hash is signed using the signer's public key signature algorithm, and any additional parameters. If the signature is valid, the result will be the same as the value carried in the BEST. In some arrangements, the key pair is associated with a digital certificate in a PKI. In other arrangements, the relying party could examine a public key component to verify message integrity but would be unable to get origin authenticity assurance. If signature fails, the relying party can reject authenticity of the received content. In some arrangements, a relaying party (e.g., middle party, merchant, etc.), that does not require the biometric matching capability, but is able to verify the signature on the BEST and trust in some of the BEST content, transmits the BEST from the signing party to the relying party. The relaying party may transmit the BEST to the relying party computing system 110. For example, the relaying party may be a merchant that receives the BEST from a credit card holder (e.g., message signer) and transmits the charge information to the relying party (e.g., credit card issuer).

At 224, the relying party verifies the TST associated with the BEST by completing a "hash check" with the information. This process includes generating a hash of the original data, appending the timestamp given by the TSA, and calculating the hash of the result (e.g., the hash of the original data with the appended time stamp). At 226, the digital signature of the TSA on the TST is validated by checking that the signed hash provided by the TSA was indeed signed with the TSA private key by digital signature verification. The hash check is compared to the hash inside the signed TSA message to confirm they are equal, proving that the timestamp was issued by the TSA and that the message is unaltered. If not, then either the timestamp was altered or the timestamp was not issued by the TSA.

At 228, the BSP computing system 108 receives the tokenized biometric sample and identifies the TSP information in a query string or an attribute in the BEST or other information provide that can be used to recover the plaintext of the token from a TSP. In some arrangements, the BSP is the TSP and processes the detokenization request in-house. At 230, the BSP computing system 108 transmits the tokenized biometric sample to the proper TSP computing system 104. At 232, the TSP computing system 104 receives the tokenized biometric sample from the BSP computing system 108 and transmits the detokenized biometric sample back to the BSP computing system 108.

At 234, the BSP computing system 108 receives the detokenized biometric sample from the TSP computing system 104. The detokenized biometric sample is compared to the biometric reference template stored in the BSP database that corresponds to identifier of the signing party of the content. A biometric processing or matching algorithm is used to compare the sample to the enrolled profile. Step 234 concludes with the BSP computing system 108 transmitting the verification value to the relying party computing system 110.

At 236, the relying party computing system 110 receives the authentication value of the biometric sample. In some arrangements, the BSP cryptographically binds the token that was matched to the match result. This can be achieved using CMS SignedData, with the two values wrapped in a signed SAML assertion that binds the match result to the tokenized template under the PKI-based key of a SAML Authority. In some arrangements, the SAML assertion is either the SignedAttributes field (to bind it to the signed content and other attributes) or in the UnsignedAttributtes field. Step 236 concludes with the relying party verifying that the record and the biometric sample belong to the signing party and are properly bound.

Figure 3:
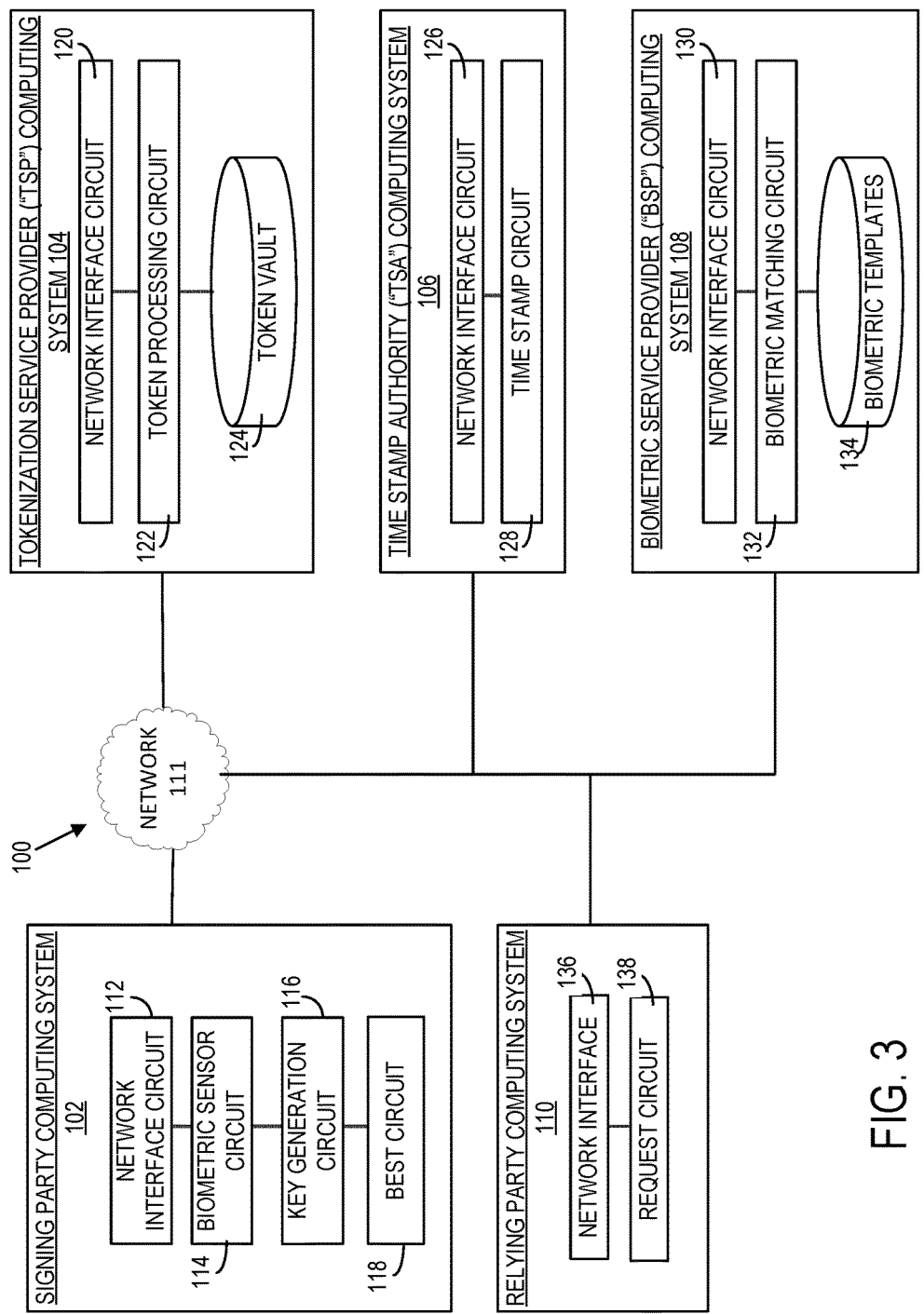
FIG. 3 is a schematic flow diagram illustrating a method of managing a biometric electronic signature token system, according to an example embodiment.

FIG. 3 is a schematic diagram of the BEST processing system 100, according to an example embodiment. The BEST processing system 100 includes a signing party computing system 102, a TSP computing system 104, a TSA computing system 106, a BSP computing system 108, and a relying party computing system 110. Each of the signing party computing system 102, the TSP computing system 104, the TSA computing system 106, the BSP computing system 108, and the relying party computing system 110 is in operative communication with the others via a network 111. The mechanisms allow for the generation and verification of the identity of a signer of an electronic message via a biometric sample and key pair. Specifically, a BEST makes it possible for the identity of the signer to be verified by a relying party (e.g., merchant, financial institution, service provider, etc.) by binding the tokenized biometric sample with a TST and attributes that facilitate the verification of the message signer. According to various arrangements, the BEST processing system 100 may be utilized to implement the methods of FIG. 2. The signing party computing system 102 may be managed by the signing party computing system 102 of FIG. 2; the TSP computing system 104 may be managed by the TSP computing system 104 of FIG. 2; the TSA computing system 106 may be managed by the TSA computing system 106 of FIG. 2; the BSP computing system

108 may be managed by the BSP computing system 108 of FIG. 2; and the relying party computing system 110 may be managed by the relying party computing system 110 of FIG. 2.

The network 111 may include, for example, the Internet, cellular networks, proprietary cloud networks, telebiometric objects on the internet of things, and the like.

Generally, the signing party may use the BEST processing system 100 to digitally sign (e.g., cryptographically bind) the record and a tokenized biometric sample of the signing party for future verification by a relying party. The signing party uses a cryptographic hash function to produce a hash of the content-to-be-signed, which includes at least the tokenized biometric sample and the record. Once a relying party has a BEST, the relying party may verify the digital signature and the biometric sample with a previously provided biometric reference value of the signing party at a BSP. Additionally, if the public/private key pair used to sign is associated with a PKI, then the assurance of the identity of the signing party (e.g., biometric sample provider) is strengthened. Additionally, the signing party can include information in an extension to the BEST (e.g., verification information, signing party information, content information, and the like) without altering the processing and signing of the digital signature. The BEST may directly include an extension of a single data type with optional fields that can contain any certificate subject account information and the information of the certificate issuer. For example, the extension includes the URL of the TSA used, how to access and where to contact the TSP and BSP, and any additional information which may be useful in facilitating the communication. Alternatively, the extension may be included combination with the BEST, for example, in a message to the relying party containing the BEST and the extension information.

The signing party computing system 102 includes a network interface circuit 112, a biometric sensor circuit 114, a key generation circuit 116, and a BEST circuit 118. The network interface circuit 112 is structured to facilitate operative communication between the signing party computing system 102 and other systems and devices over the network 111. The signing party computing system 102 may include smartphones, tablet computing systems, laptop computing systems, desktop computing systems, PDAs, smart watches, smart glasses, tablets, etc.

The biometric sensor 114 is structured to extract biometric data. For example, the sensor can be structured to read a fingerprint, voice print, or other biometric marker. Generally, the biometric sensor 114 is any technology type that supports the capture of biometric data. The biometric sensor 114 can be used to generate a biometric reference template or a biometric sample used for verification. In some arrangements, the raw biometric data extracted from the biometric sensor 114 needs to be further processed by a BSP for it to be a data type that is usable by the TSP.

The key generation circuit 116 is structured to generate a public/private key pair for the digital signature of a BEST. In some arrangements the public/private key pair is associated with a digital certificate in a PKI, for example, the X.509 certificate. In those arrangements, a key pair is generated (the private/public key pair must be generated together as they are mathematically related), the private key signs the public key, and the pair is submitted to the certificate authority ("CA") or the front end registration authority that will then generate that public key certificate. Alternatively, the private/public key pair could be issued with a commercial CA, for example, one associated with a financial institution. In some arrangements, the signing party computing system 102 retrieves a public key certificate from the commercial certificate authority and uses the certificate to ascertain the public/private key pair. In other embodiments, the key generation circuit 116 generates an ephemeral public/private key pair not associated with a digital certificate in a PKI. In these embodiments, the public key can be included in the attributes of the BEST, allowing a digital signature verifier to use the included public key component to verify message integrity. In these arrangements, the verifier will be able to verify message integrity (e.g., that it has not been modified), but will not gain origin authenticity assurance (e.g., know who signed the message and who possessed the private key component of the key pair).

A BEST circuit 118 is structured to generate the BEST by retrieving the private key from the key generation circuit 116 and digitally signing (and therefore cryptographically binding) the content, biometric sample, and additional attributes specified by the protocol or signing party. The BEST circuit 118 manages the key generation circuit 116 and controls the generation of key pairs according to the desired BEST (e.g., whether the key is associated with a PKI, CA, etc.). Once a key pair is generated, the BEST circuit 118 determines what additional attributes (or OIDs) are to be bound to the message under the digital signature. The attributes can include, for example, a transaction identifier, a signing party identifier, a system generated time stamp, a public key, a uniform resource identifier query string including a uniform resource locator signifying a TSP capable of recovering plaintext of the tokenized biometric sample, or a uniform resource identifier for the BSP capable of matching the biometric sample to a biometric reference template. In some arrangements, the identifier can be of a registered object (e.g., unique RFID, a telebiometric authentication identifier, etc.) allowing an additional authentication layer of "something-you-have." For example, the signing party wants to withdraw funds from an ATM, to validate the withdrawal the BEST circuit 118 could include signed attributes of a financial institution identifier, an account number, a TSP URL, a BSP identifier, and an ATM generated time stamp.

The BEST circuit 118 can accommodate and facilitate a variety of digital signature methods. Generally, the BEST circuit 118 organizes the content, tokenized biometric sample, TST, any attributes, and the private key used for the digital signature. In some arrangements, the digital signature is achieved using SignedData CMS to generate a SignedData message. With SignedData, there is no need to send the actual certificate along in the message; instead an attribute or other identifier can indicate which certificate the recipient needs to verify the signature. For example, an attribute could include "certificate issuer DN and certificate serial number 123" that uniquely identifies the signing certificate. Beneficially, the BEST would be relatively small, while still providing all of the information a relying party would need to verify the signature and other BEST contents. In some arrangements, the digital signing occurs on a hash of the tokenized biometric sample and/or a hash of the content. The hash limits processing and used issues of the un-hashed versions of the content and tokenized biometric sample, for example using Detached SignedData on a text file containing the content, where a hash of the text file is the input and the text file could be omitted from the SignedData message in order to limit the disruption in the operation of the text file.

The TSP computing system 104 includes a network interface circuit 120, a token processing circuit 122, and a token vault 124. The TSP computing system 104 may include, for example, one or more servers each with one or more processors configured to execute instructions stored in a memory, send and receive data stored in the memory, and perform other operations to implement the financial services described herein associated with the processing modules, databases, and processes. In some arrangements, some or all of the TSP computing system 104 is within the BSP computing system 108.

The network interface circuit 120 is structured to facilitate operative communication between the TSP computing system 104 and other systems and devices over the network 111.

The token processing circuit 122 is structured to organize and facilitate the back-end process necessary to process any biometric samples received by the signing party computing system 102. Tokenization is a process in which a token is substituted as a proxy for data thereby obscuring the underlying data. Accordingly, a token is a surrogate value that can be used to replace some underlying sensitive value. The tokens may be generated, stored, and maintained by an entity that specializes in the tokenization process. A token can be made to look very similar to the underlying data that it is serving as a proxy for such that that no reconfiguration of systems is required (e.g., the token is "format preserving"). The mapping of underlying sensitive values to tokens does not have to be one-to-one. As in the example above, different tokens could replace the same PAN in two separate data repositories. A token attribute may share a common value with the original underlying value it is replacing or be specific to the token itself. For example, the token may share the structure of that value, (e.g., the length and character set) or a mechanism to determine that the token is actually a token (e.g., actually represents a replacement value rather than the original underlying value).

The token processing circuit 122 is structured to tokenize and detokenize the biometric reference sample before the message is digitally signed. The token processing circuit 122 also facilitates the detokenization requests for the biometric sample by a relying party, either directly or indirectly. This includes the TSP receiving requests from a BSP that has received a matching request from a relying party containing the tokenized biometric sample. The token processing circuit 122 may contain rules generated from the TSP computing system 104, for example, the tokenization schemas used. The token processing circuit 122 is in communication with the token vault 124 to store and retrieve the generated tokens. The token vault 124 is structured to store the tokens generated by the token processing circuit 122 and retrieve the tokens.

The TSA computing system 106 includes a network interface circuit 126 and a time stamp circuit 128. The TSA computing system 106 is managed by any trusted time authority that can provide a TST for a piece of information or data entry. The trusted time authority can be one that complies with the X9.95 standard, or those defined in similar standards by ISO/IEC, and satisfies legal and regulatory requirements. In some arrangements, the TSA computing system 106 may be contained in, and controlled by, the TSP computing system 104 or the BSP computing system 108. The network interface circuit 126 is structured to facilitate operative communication between the TSA computing system 106 and the message computing system 102 over the network 111. The time stamp circuit 128 is structured to negotiate a trusted TST, which includes receiving a hash of a piece of information and generating a trusted TST for the information for future verification. In some arrangements, the TST is generated inter-device (e.g., capturing the system time, or mobile phone time), and the TST is stored as an attribute in the BEST.

The BSP computing system 108 includes a network interface circuit 130, a authentication circuit 132, and a biometric reference template (e.g., value) database 134. The network interface circuit 130 is structured to facilitate operative communication between the BSP computing system 108 and other systems and devices over the network 111. In some arrangements, some or all of the BSP computing system 108 is within the TSP computing system 104. Generally, the BSP computing system 108 stores biometric reference templates for users and handles biometric matching requests from relying parties. Before using the BEST processing system 100, the signing party must have enrolled with the BSP and created a biometric reference template. In some arrangements, the biometric sample may only be transmitted by an employee of the BSP entering the data into a computing system (e.g., an employee terminal connected to the server of the BSP) during a person-to-person interaction. For example, the customer may walk into a branch location of the BSP and initiate the enrollment process via interaction with a teller.

The biometric reference template database 134 is a plurality of user identifiers and corresponding biometric reference templates, which are a byproduct of the customer enrolling in the biometric service. The user identifier can be, for example, a user name, email address, phone number, or the actual name of the customer. The user identifier may be stored in the attributes or fields of the SignedData message.

The authentication circuit 132 is structured to receive a biometric sample and an authentication request from the relying party computing system 110 over the network 111 and compare the received sample to a stored reference template. The authentication request includes a request for verification and/or identification. Verification is the process of comparing a match template against a specific reference template based on a claimed identity (e.g., user ID, account number). Verification is a "one-to-one" comparison which entails the comparison of a match template generated from a newly captured sample with a previously generated reference template stored in a database or on an ID card. Identification is the process of comparing a submitted biometric sample against some or all enrolled reference templates to determine an individual's identity. Identification is a "one-to-many" comparison which entails the comparison of a match template generated from a newly captured sample with all of the templates in the database. It is most often used to determine whether or not a person has previously enrolled in the system.

In some arrangements, when the authentication circuit 132 receives a tokenized biometric sample, the BSP must transmit a request for detokenization to the TSP computing system 104 to receive the detokenized biometric sample for matching. In other arrangements, the relying party computing system 110 submits the request and receives the detokenized biometric sample from the TSP computing system 104. Upon receipt of a matching request and detokenized biometric sample, the authentication circuit 132 finds the corresponding biometric reference template for the user in the biometric reference template database 134. The authentication circuit 132 then compares the biometric sample to the detokenized biometric reference template. The comparison can include using a biometric processing algorithm or a biometric matching algorithm. If the sample matches the reference template, the authentication circuit 132 transmits a positive authentication value to the relying party computing system 110. In some arrangements, the authentication circuit 132 will provide a negative matching value if there is no matching user identifier in the biometric reference template database 134 or if the user does not have a biometric reference template for the biometric type of the biometric sample.

The relying party computing system 110 includes a network interface circuit 136 and a request circuit 138. Generally, the relying party computing system 110 receives the BEST from the signing party computing system 102 and verifies the identity of the signing party. The network interface circuit 136 is structured to facilitate operative communication between the relying party computing system 110 and other systems and devices over the network 111. The process for verifying a BEST is described in greater detail above in method 50 of FIG. 2.

The request circuit 138 is structured to facilitate the authentication of the biometric sample in the BEST with a biometric reference template stored on the BSP computing system 108. In some arrangements, there is an application or web browser on the computing system that facilitates this process. For example, upon receiving the BEST, the relying party computing system 110 automatically begins verification of the signature, transfers a detokenize request with the TSP computing system 104, and transfers the received detokenized biometric sample to the BSP computing system 108 for matching. Generally, after signature verification is performed, subsequent processing allows the plaintext biometric data to be recovered from the tokenization element by a message recipient. This element can be in the form of a simple oblique value (a string of octets) or structured content that contains the tokenized biometric data value and any information needed to recover the plaintext, such as the URL address of a tokenization service provider or web service, an indication of the specific tokenization technique being used, and any other required data or authentication information. The information needed for token processing can instead be contained in an attribute of the digital signature message that may be cryptographically bound to the biometric reference template being signed under the same digital signature. In some arrangements, the attribute of the digital signature message may be cryptographically bound to a hash of the tokenized biometric sample.

Figure 4:
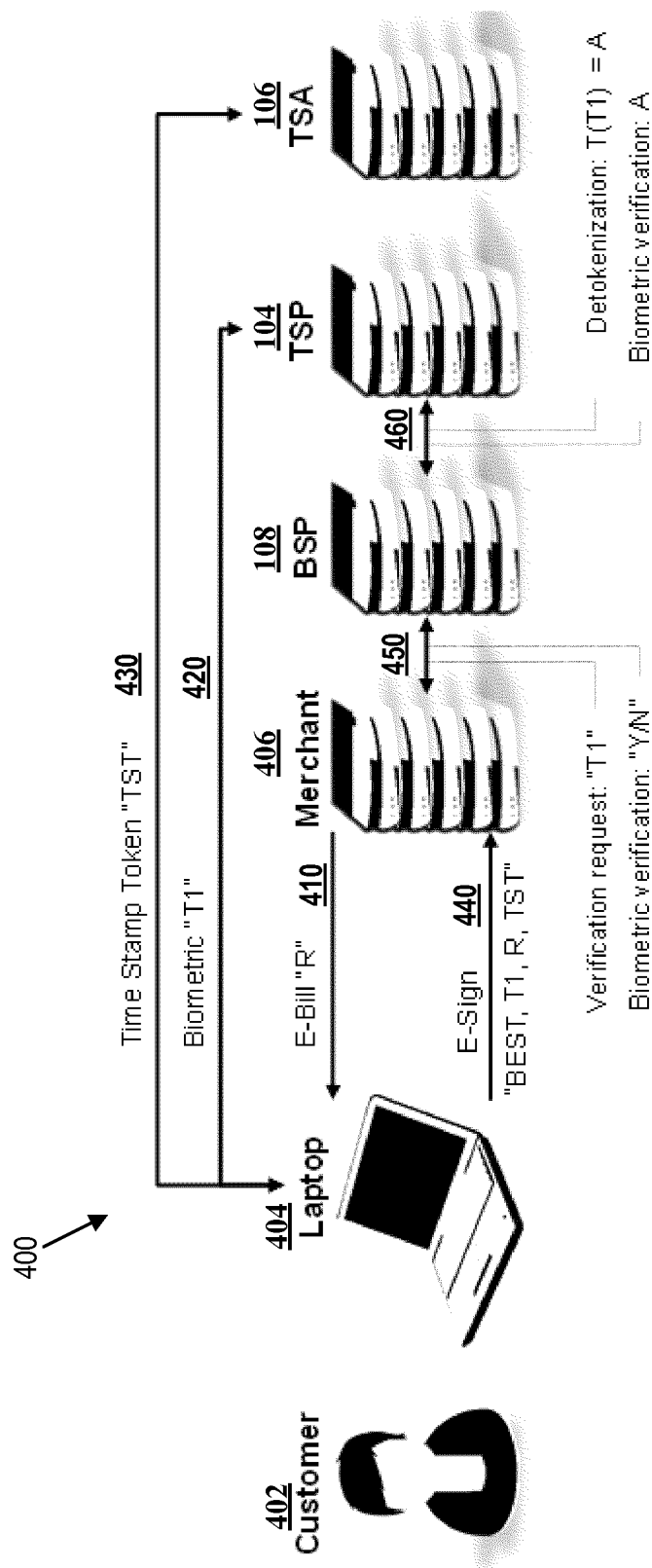
FIG. 4 is a schematic diagram of a biometric electronic signature token system, according to an example embodiment.

FIG. 4 is a schematic flow diagram illustrating a method 400 of managing the BEST processing system, according to an example embodiment. The method 400 includes a customer 404 who manages the signing party computing system 102, a customer computing device 402, a merchant 406 who manages the relying party computing system 110, the BSP computing system 108, the TSP computing system 104, and the TSA computing system 106. Each of the entities are in operative communication with the others via a network. The method 400 allows for receiving a biometric sample from the customer 102, tokenizing the biometric sample, time stamping the content-to-be-signed, and digitally binding the tokenized biometric sample and the record. In FIG. 4, the BSP, TSP, and TSA are separate entities, but in some arrangements one or more of the services may be performed by the same service entity.

Generally, the method 400 involves the customer 402 wanting to provide assurance to the merchant 406 that the customer 402 is the identity of the person who has agreed to (and perhaps actually physically signed and uploaded or provided an electronic signature on) the electronic bill ("e-bill"). The method 400 concludes with the customer 402 transmitting to the merchant 406 a BEST, the e-bill, a tokenized biometric sample, and a TST. The method 400 assumes that the customer 402 has a biometric reference template stored on the BSP computing system 108. The method 400 gives the customer 402 portability without being responsible and at risk for being in possession of their biometric reference template.

The method 400 begins at 410 with the merchant 406 transmitting the e-bill to the laptop 404 of the customer 402. The e-bill may be for services to be rendered, an agreement that services have been performed, or the like.

The process of generating the BEST begins at 420 with the customer 402 extracting his or her biometric sample and transmitting it to the TSP computing system 104. The customer 402 accesses the BEST processing system 100 and provides a biometric sample through an interface on the laptop 404. On the back-end, the BEST processing system 100 extracts the biometric sample, submits it to a TSP, and returns a tokenized biometric sample to complete step 420. The biometric sample can include, but is not limited to, a fingerprint, retina scan, voice profile, hand geometry, signature, and/or facial scan. Tokenizing the biometric sample with a TSP protects the confidentiality of the customer's 402 biometric sample.

At 430, the customer 402 generates a hash of the tokenized biometric sample and submits a time stamp request and the hash of the tokenized biometric sample to the TSA computing system 106. The time stamp request contains a hash value (e.g., the hash of the tokenized biometric sample), the time stamp (e.g., time of generation) and a cryptographic binding (e.g. cryptography). The TSA computing system 106 returns a response containing the time stamp token TST to the customer 402, which provides evidence that the digital data existed at the time indicated in the time stamp.

At 440, the customer 402 generates the BEST and transmits the BEST to the merchant 406 to finalize the transaction. The process of generating the BEST is described in greater detail above, in method 10 of FIG. 1. In some arrangements, the BEST may contain attributes (e.g., extensions) related to the payment instructions, customer account number, payment type, merchant identifier, and the like. Since the tokenized biometric sample is coupled with a public/private key pair associated with a PKI, the association prohibits the unauthorized re-use of customer's 402 biometric sample as a fraudulent use would require both the biometric sample and the customer's 402 private key.

At 450 the merchant 406 verifies the tokenized biometric sample by transmitting a verification request and the tokenized biometric sample to the BSP computing system 108. The BSP must be the one that the customer 402 has enrolled (e.g., generated and stored a biometric reference value) at. In some embodiments, the attributes in the BEST transmitted at 440 include verification request instructions (e.g., a URL) for the BSP and TSP.

At 460 the BSP 50 receives the tokenized biometric sample and transmits the sample to the TSP computing system 104 to detokenize the sample. In some arrangements, the merchant 406 performs the request to detokenize the tokenized biometric sample with the TSP before the merchant 406 submits a verification request with the BSP. In some arrangements, the TSP and BSP are the same entity. As shown in method 400, at 460 the BSP receives the detokenized biometric sample from the TSP computing system 104.

To complete step 450, the BSP computing system 108 uses a matching algorithm to compare the biometric reference value and the detokenized biometric sample and transmits the biometric verification result (e.g., a match or no match) to the merchant 406.

Figure 5:
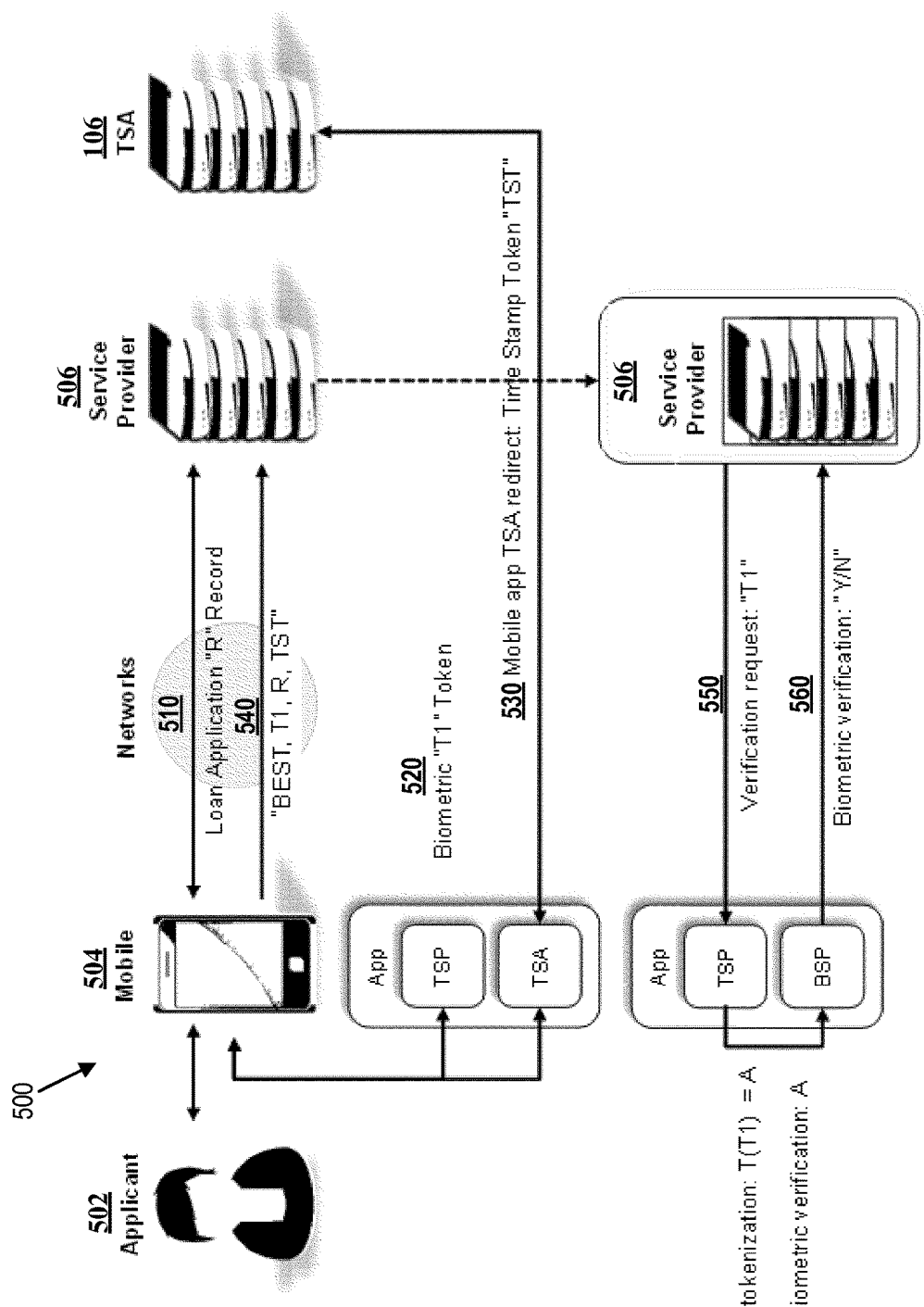
FIG. 5 is a schematic flow diagram illustrating a method of managing a biometric electronic signature token system, according to an example embodiment.

Referring to FIG. 5, a schematic flow diagram illustrating a method 500 of managing the BEST processing system 100 is shown, according to an example embodiment. The method 500 includes an applicant 502, a service provider 506 (e.g., a lending institution, financial institution, etc.), and a TSA computing system 106. The applicant 502 may be an entity that manages the signing party computing system 102 of FIG. 1 and the service provider 520 may be an entity that manages both the TSP computing system 104 and the BSP computing system 108 of FIG. 2.

The method 500 begins when the applicant 502 receives a loan application from a service provider 506 on the applicant's mobile computing device 504 at 510. The applicant 502 approves the loan application by providing a biometric sample via a mobile application ("App") on the mobile computing device 504 at 520. The mobile application can be one that accomplishes similar features to the BEST circuit 118 of the signing party computing system 102 of FIG. 3.

At 520 the applicant 502 provides the biometric sample on the mobile device 504 in the form of a fingerprint, for example. On the back-end, the App on the mobile device 504 tokenizes the biometric sample to generate a tokenized biometric sample. This process may include transmitting the biometric sample to a TSP for tokenization. In other arrangements, the App has software that tokenizes and logs/stores the tokenization information.

At 530 the App negotiates a TST from the TSA computing system 106. This includes hashing the tokenized biometric sample and time stamping the hash to generate a TST.

At 540 the App digitally signs a hash of the tokenized biometric reference template appended to the loan application to generate a BEST. A BEST generation process is described in greater detail in method 10 of FIG. 1. The App transmits the BEST, tokenized biometric reference template, the loan application, and the TST to the service provider 506 to compete step 540.

At a later time, the applicant's 502 loan application is reviewed by the service provider 506. At 550, the service provider has a BEST relying party application to verify the information provided. At 550 the service provider opens the information provided at 540 in the application and submits a verification request.

On the back-end, at 560, the application verifies the BEST, detokenizes the biometric sample, and verifies the biometric information. This process is described in greater detail above in method 50 of FIG. 2. On the front-end, at the completion of step 560, the service provider receives the biometric and BEST verification notifications from the application.

An example use of the method 500 would be to place a future-verifiable bid on an item. For example, the method 500 is used to generate a BEST message including the biometric sample and content regarding the bid price and bid item. By not using an identity certificate, the signing party may submit the bid BEST message on a public repository (e.g., a blockchain, cloud, public ledger, etc.) without giving away the signing party's identity. If the signing party fails to win the bid, the information will be cryptographically bound and encrypted using tokenization. However, if the signing party's bid is the winning bid, the signing party could subsequently provide evidence that the signing party possesses the private key that was used to sign the BEST message and identify the BSP for which to validate the identity of the signing party.

Figure 6:
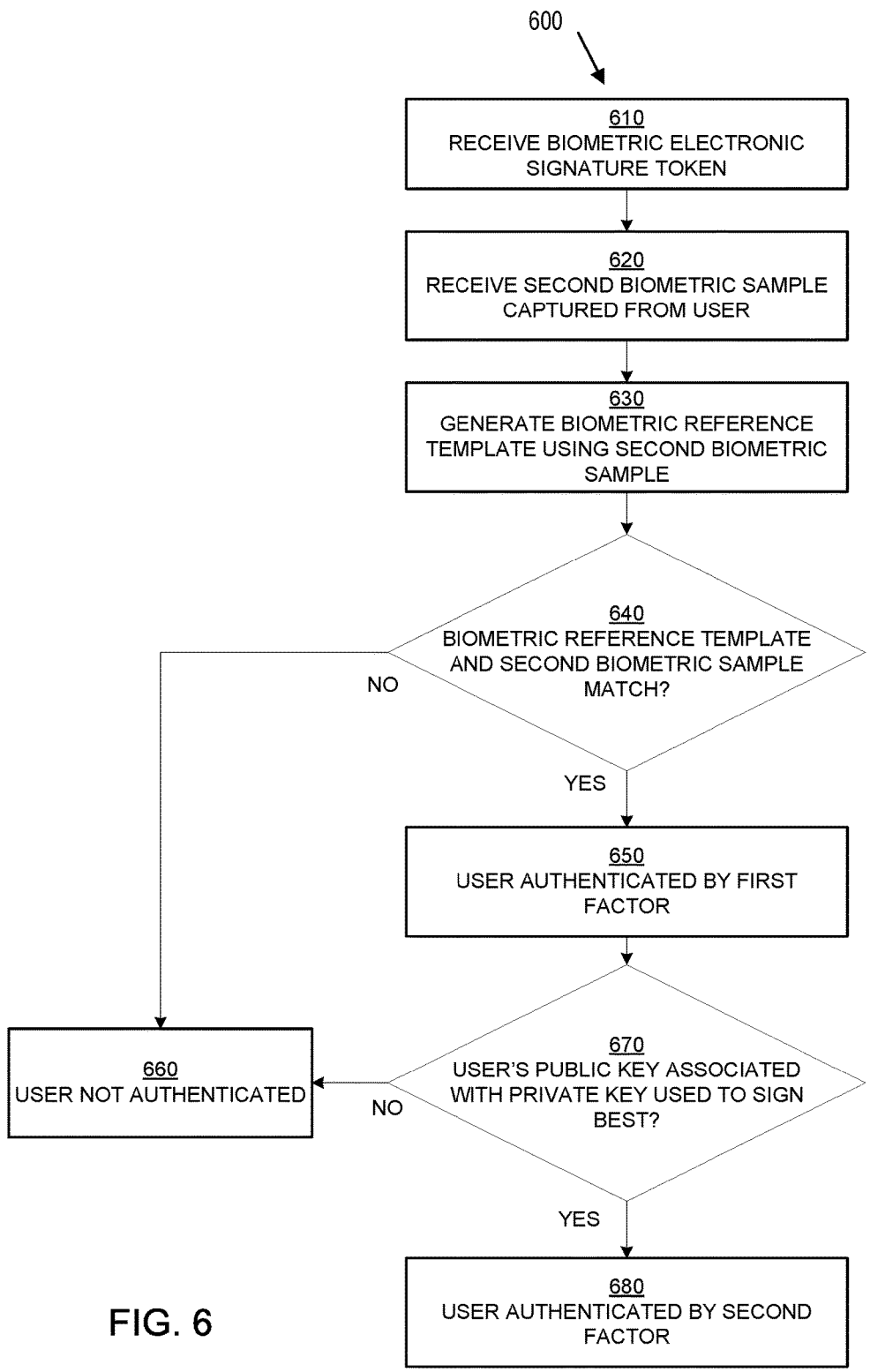
FIG. 6 is a flow diagram illustrating a method of verifying the identity of a signing party without signing party previously enrolling with a BSP, according to an example embodiment.

FIG. 6 is a flow diagram illustrating a method 600 of verifying the identity of a signing party that has generated a BEST without the signing party previously enrolling with a BSP, according to an example embodiment. According to various embodiments, the method 600 may be performed by an independent third party to authenticate the user purporting to have biometrically signed the BEST using a second biometric sample captured from the user. This provides a first authentication factor that the user is the signing party. In some embodiments, the method 600 includes authenticating the user via a second authentication factor by verifying that the owner of the private key used to generate the BEST (the signing party) is the individual identified in the tokenized biometric sample included in the BEST.

At 610, a BEST is received. According to various embodiments, the BEST comprises a message including a first tokenized biometric sample captured from a signing party and a record. The message has been digitally signed with a private key associated with the signing party.

At 620, a second biometric sample is received. The second biometric sample has been captured from a user purporting to be the signing party that biometrically signed the BEST with the first biometric sample captured from the signing party.

At 630, a biometric reference template is generated based on biometric characteristics extracted from the second biometric sample. In some arrangements, the generation of the biometric reference template can be done by an another party, for example, a BSP.

At 640, it is determined whether the biometric reference template generated at 630 using the second biometric sample is matched against the first biometric sample in the BEST. In some arrangements, a biometric matching service it utilized to complete the match. In some arrangements, the first biometric sample in the BEST is tokenized, and a TSP is utilized to detokenize the first tokenized biometric sample. If the result of 640 is "YES" and the biometric reference template and the first biometric sample match, then the user is authenticated by a first authentication factor at 650. This verifies that the user is the signing party. If the result of 640 is "NO" and the biometric reference template and the first biometric sample do not match, then the user is not authenticated at 660.

At 670, it is determined whether a public key associated with the user is part of a key pair including the private key used to digitally sign the message to generate the BEST. This verifies that the owner of the private key used to generate the BEST (the signing party) is the individual identified in the tokenized biometric sample included in the BEST. If the result of 670 is "YES," then the user is authenticated by a second authentication factor at 680. If the result of 670 is "NO," then the user is not authenticated at 660. According to various embodiments, authentication may be performed using either of 640 and 670, or both of 640 and 670.

The arrangements described herein have been described with reference to drawings. The drawings illustrate certain details of specific arrangements that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, video and audio recording devices, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include flat currencies, non-flat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed:

1. A method comprising:
tokenizing, by a computing system, a biometric sample captured from a user to generate a tokenized biometric sample;
digitally signing, by the computing system, each of a hash of a record and the tokenized biometric sample with a private key associated with the user to generate a digitally signed hash of the record and the tokenized biometric sample;
generating, by the computing system, a hash on the tokenized biometric sample; and
retrieving, by the computing system, a time stamp token, the time stamp token including the hash on the tokenized biometric sample cryptographically bound to a time stamp, wherein the time stamp token is subsequently validated;
storing, by the computing system, the digitally signed hash of the record and the tokenized biometric sample at a location on a repository; and
generating, by the computing system, a digital message, the digital message comprising the record and an attribute associated with the location of the repository,
wherein authenticity and data integrity of the record can be determined by retrieving the digitally signed hash of the record and the tokenized biometric sample at the location identified in the digital message and based on each of the digitally signed record, the tokenized biometric sample, and a public key of a public/private key pair including the private key, and
wherein an identity of the user may be validated by detokenizing the tokenized biometric sample and matching the detokenized tokenized biometric sample with a biometric reference template associated with the user.

2. The method of claim 1, wherein the time stamp token is a trusted time stamp token.

3. The method of claim 1 wherein validity of the digital signature is determined by:
verifying that the public key is associated with the user;
verifying that the digitally signed time stamp token was signed with the public key;
generating a hash on the tokenized biometric sample; and
verifying that the time stamp token was generated using the hash.

4. The method of claim 3, wherein verifying that the public key is associated with the user includes a certificate validation.

5. The method of claim 1, wherein identity of the user is authenticated by:
detokenizing the tokenized biometric sample to obtain the biometric sample;
matching the biometric sample to a biometric reference template associated with a registered identity; and
verifying that the registered identity matches the user.

6. The method of claim 1, wherein digitally signing includes an extension to a certificate issued to the user, the extension including information related to the user and the public/private key pair.

7. The method of claim 1, wherein tokenizing the data further includes:
transmitting, by the computing system, the biometric sample to a tokenization service provider; and
receiving, by the computing system from the tokenization service provider, the tokenized biometric sample.

8. The method of claim 6, wherein digitally signing includes an extension identifying the tokenization service provider that generated the tokenized biometric sample.

9. The method of claim 1, wherein digitally signing the message is accomplished using SignedData cryptographic message syntax to generate a SignedData message.

10. The method of claim 9, wherein a bundled certificate extension includes a signed attribute bound to the SignedData message, the bundled certificate extension including a certificate issuer and a certificate identifier.

11. The method of claim 1, further comprising:
receiving, by the computing system, the tokenized biometric sample and an authentication request, wherein the authentication request is associated with the digitally signed message and has been verified using the public key; and
generating, by the computing system, a confirmation verification, the confirmation verification including a match value for the biometric sample and a biometric reference of the user, the match value generating using a biometric matching process.

12. A system comprising:
a storage device comprising a plurality of biometric reference templates;
an authentication server system, the authentication server system comprising a processor and instructions stored in non-transitory machine-readable media, the instructions configured to cause the server system to:
enroll a biometric reference template for a signer;
generate a digital message, the digital message comprising a record and an attribute associated with a location of a repository; and
generate an electronic signature, wherein generating the electronic signature comprises:
associating the record with the electronic signature;
establishing an asymmetric key pair, the asymmetric key pair including a public and private key pair;
receiving a biometric sample captured from the signer;
tokenizing the biometric sample to generate a tokenized biometric sample;
generating, by the computing system, a hash on the tokenized biometric sample;
retrieving, by the computing system, a time stamp token, the time stamp token including the hash on the tokenized biometric sample cryptographically bound to a time stamp, wherein the time stamp token is subsequently validated;
digitally signing a signature message with the private key, the signature message including the tokenized biometric sample and the record,
wherein authenticity and data integrity of the record can be determined by retrieving the digitally signed hash of the record and the tokenized biometric sample at the location identified in the digital message and based on each of the digitally signed record, the tokenized biometric sample, and a public key of a public/private key pair including the private key, and
wherein an identity of the user may be validated by detokenizing the tokenized biometric sample and matching the detokenized tokenized biometric sample with the biometric reference template; and
storing the signature message at the location on the repository.

13. The system of claim 12, wherein the time stamp token is a trusted time stamp token.

14. The system of claim 12, wherein the instructions are further configured to cause the server system to generate a hash of the message; and wherein digitally signing the message with the private key includes generating a digital signature using the hash of the message.

15. The system of claim 12, wherein digitally signing includes an extension to a certificate issued to the signer, the extension including information related to the user and the record.

16. The system of claim 12, wherein digitally signing the message is accomplished using SignedData cryptographic message syntax to generate a SignedData message.

17. The system of claim 16, wherein a bundled certificate extension is a signed attribute bound to the SignedData message, the bundled certificate extension including a certificate issuer and a certificate identifier.

18. The system of claim 12, wherein the instructions are further configured to cause the server system to:
   transmit the biometric sample to a tokenization service provider; and
   receive, from the tokenization service provider, the tokenized biometric sample.

19. The system of claim 12, wherein digitally signing includes an extension identifying the tokenization service provider that generated the tokenized biometric sample.

20. The system of claim 12, wherein the instructions are further configured to cause the server system to:
   receive the tokenized biometric sample and an authentication request, wherein the authentication request is associated with the digitally signed message and has been verified using the public key; and
   generate a confirmation verification, the confirmation verification including a match value for the biometric sample and the biometric reference of the user, the match value generating using a biometric matching process.

21. A method, comprising:
   receiving, by a computing system, a digital message, the digital message comprising a record and an attribute associated with a location of a repository;
   receiving, by the computing system, an electronic signature from the location of the repository, the electronic signature comprising a message including a first tokenized biometric sample captured from a user, a time stamp token, and the record, the message having been digitally signed with a private key; and
   verifying, by the computing system, the electronic signature, wherein verifying the electronic signature comprises:
   receiving, by the computing system, a second biometric sample captured from the user; and
   generating, by the computing system, a biometric reference template based on biometric characteristics extracted from the second biometric sample;
   wherein authenticity and data integrity of the record can be determined by retrieving the digitally signed hash of the record and the tokenized biometric sample at the location identified in the digital message and based on each of the electronic signature, the first tokenized biometric sample, and a public key of a public/private key pair including the private key, and wherein the user may be authenticated by verifying that the public key associated with the user is part of the public/private key pair including the private key used to digitally sign the message,
   wherein an identity of the user may be validated by detokenizing the first tokenized biometric sample and matching the detokenized first tokenized biometric sample with the biometric reference template; and
   verifying, by the computing system, the time stamp token.

* * * * *